April 10, 1951

C. L. PETERSON ET AL 2,547,969

DRUM FILTER MEDIUM

Filed Jan. 28, 1948

INVENTORS
Blair Burwell,
C. Lynn Peterson
& Clarence J. Peterson

By
ATTORNEY

April 10, 1951 — C. L. PETERSON ET AL — 2,547,969
DRUM FILTER MEDIUM
Filed Jan. 28, 1948 — 3 Sheets-Sheet 3

INVENTORS
Blair Burwell,
C. Lynn Peterson
& Clarence J. Peterson
By W. A. McGrew
ATTORNEY Patented Apr. 10, 1951

2,547,969

UNITED STATES PATENT OFFICE 2,547,969

DRUM FILTER MEDIUM

C. Lynn Peterson and Clarence J. Peterson, Salt Lake City, Utah, and Blair Burwell, Grand Junction, Colo., assignors to Peterson Filters and Engineering Co., a firm Application January 28, 1948, Serial No. 4,844

8 Claims. (Cl. 210—199)

Our invention relates to filters, particularly to new filtering apparatus and processes for filtering adaptable for use with cylindrincal filters such as those of the drum type and is a continuation-in-part of our prior application Serial No. 536,880, filed May 23, 1944, which has been abandoned subsequent to the filing of this application.

Conventional drum filters usually employ a filter medium of cloth, or other thin woven material of similar nature, wrapped tightly around the periphery of a perforate drum which is rotatably supported in a tank containing a liquid in which solid particles of various sizes are suspended. The filtering process is accomplished by drawing the liquid into the drum through the cloth by vacuum, leaving the solid particles on the peripheral cloth from which they are removed as the drum rotates by a suitable scraper, assisted sometimes by the application of air or liquid under pressure from within the drum. To utilize both vacuum and fluid pressure in the process, the drums are often divided into a number of segments, each having conduits for carrying away the filtered liquid and utilizing fluid under pressure for removal of the solids from the filter.

Filters of this order are subject to several shortcomings. For example, if the weave of the filter cloth employed is relatively coarse, a good flow of liquid with relatively low impedance is attained, but the fine particles will not be filtered from the liquid and will pass through the cloth in the filtrate. If a finer weave cloth is used the impedance rises rapidly, restricting the flow to a point where very few of the large particles will be drawn to the filter. Filters employing closely woven cloth will also require considerable power in operation and must be operated slowly. Furthermore, the cloth employed as a filter medium is quite sensitive to damage since undue wear or tearing at even one point is sufficient to destroy the utility of the cloth, thereby necessitating costly replacement and putting the device out of service for an extended period of time.

Encrustation is also sometimes encountered, this phenomenon apparently occurring where salts such as calcium sulphate are present in the material being filtered. These salts are believed to deposit from solution on the fibres of the filter medium, eventually building up in thickness to a point when the utility of the medium is destroyed. Ordinary backwashing or blowing will not remove deposits of this order, and if the pressure of the air or liquid is increased to a point where the filter cloth is appreciably flexed, rupture of the cloth will occur prematurely.

Among the important objects of this invention is the provision of an improved process and apparatus for filtering liquids, which overcomes these and other difficulties encountered in prior art devices, which will filter coarse and fine particles or mixtures thereof efficiently with the same filter medium, which is durable, efficient and inexpensive, which may be easily cleaned, in which the effects of encrustation may be overcome without difficulty, and which utilizes a filter medium of controllable density.

Other objects include the provision of novel filter components and arrangements thereof and methods of utilization, as will become apparent from the following specification and from the appended drawings, in which.

Figure 1:
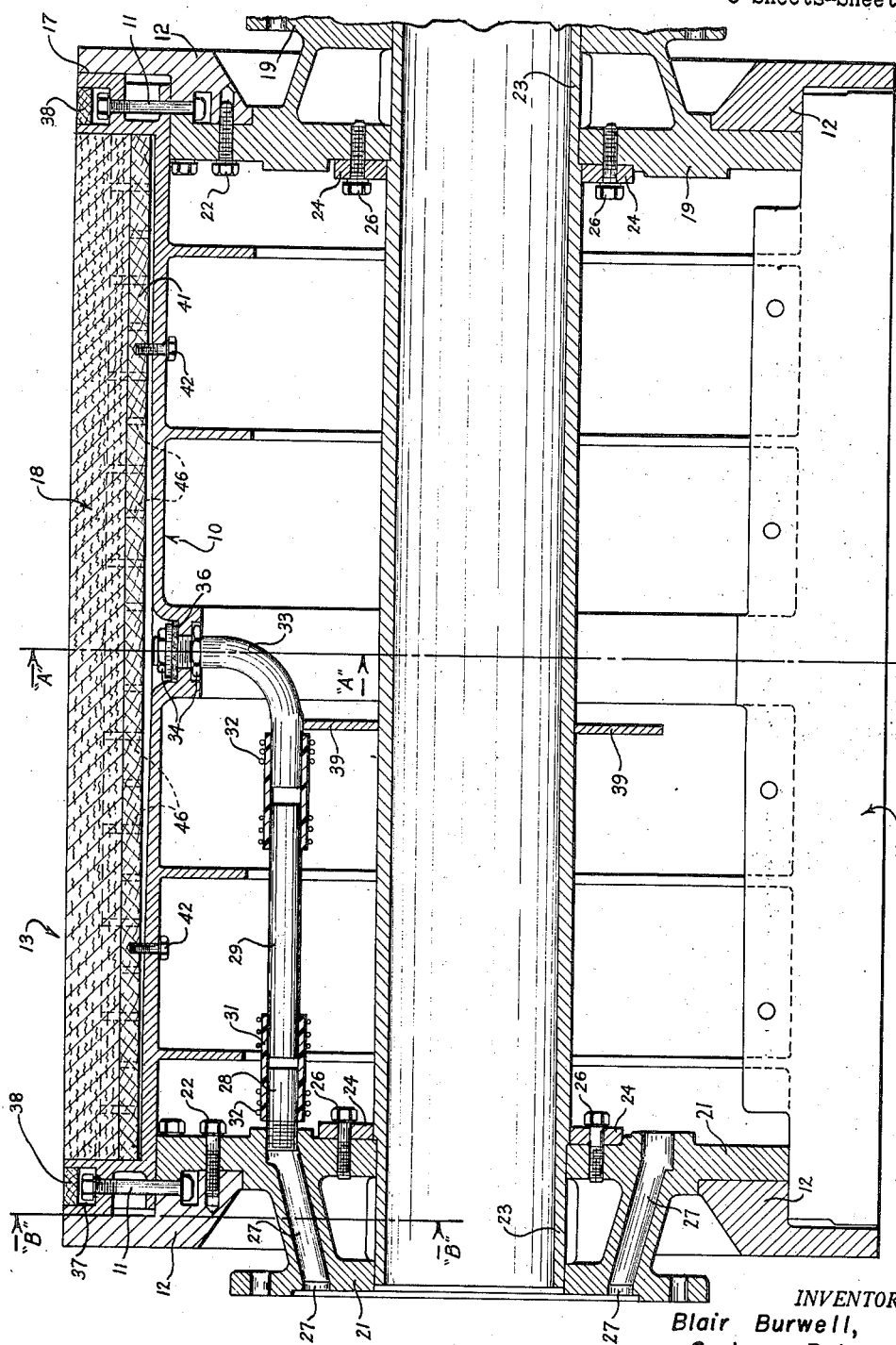
Fig. 1 is a longitudinal sectional view of a filter drum embodying the principles of this invention.

Inasmuch as drum filters are in widespread industrial use, the following description will be confined largely to the adaptation of our invention to filters of this general type, but the application of the herein disclosed principles to other types of filters will be obvious to those skilled in the art and hence is to be considered as within the scope of our invention.

Our filter utilizes a concept herein termed "depth filtration" wherein the liquid to be filtered is caused to pass through a relatively deep filter medium of compressible fibrous matting, folded into face to face contact, the faces being arranged generally parallel to the direction of liquid flow through the filter medium. These relatively thick sheets or mats, comprising the filter medium, may be disposed within peripheral openings formed in the walls of the drum with one surface of the folds or edges of the matting disposed approximately at the drum surface, and may be formed of cocoa fibre, fibre glass, or the like. The matted fibrous structure forms an infinite number of interconnecting, tortuous passageways through which the liquid being filtered, and initially containing relatively small solid particles, flows in response to vacuum exerted on the inner or under side of the medium. The coarser particles are entrapped by the filter medium at the upper or outer surface, while the finer particles will in general penetrate somewhat more deeply into the matting. As the particles are entrapped by the matting, they in turn form a secondary filtering layer, but since the finer particles will in general pass through the outer layer of coarser particles, the cake formed on the surface does not generally contain a sufficient diversity of particle sizes to pack to a high density and form, as is often the case in conventional filters, an almost impermeable outer shell through which further liquid or air can pass only with the greatest difficulty. In our filter backwashing or blowing dislodges both the coarse and the fine particles with less difficulty, a scraper usually being employed to assist in the removal of the surface deposit, which is usually the most voluminous.

Either the cut or folded edges of the matting may be exposed to the unfiltered liquid, the essential characteristic of the medium being the provision of sufficient depth to yield good filtering without high impedance. We believe that the low and generally uniform impedance of our filter is probably due at least in part to the enormous number of small tortuous passageways through the matting, it being improbable that all of these passageways would become plugged with solid particles during normal intelligent operation of the filter, and therefore will allow the passage of a greater quantity of liquid than is usually required during each cycle of the filter.

The precise thickness of filter medium required in each specific instance to attain depth filtration is relative to many other factors and hence cannot be established empirically herein. The matting may vary from $\frac{1}{16}$ to 1" in thickness, and may be folded to form media of substantially any depth. In general, the depth should be more than twice the thickness of the mat, assuming the use of ordinary mats folded as hereinafter described, and will increase as the duration of filtering cycle increases or the size of the particles decreases. Thicker filters operating at a low effective average density are generally more efficient than filters using thinner medium compressed to a higher average effective density.

In our preferred form, the peripheral openings in the drum taper inwardly toward the drum axis and substantially enclose all but the inner and outer surfaces of the folded matting. We may therefore increase or decrease the effective density of our filter medium by moving the matting inwardly or outwardly from the drum axis within the opening, thus varying the compressive force exerted against the matting by the walls of the opening. Ordinarily we prefer to form the matting and the walls of the opening in such manner that the greatest degree of compression is applied to the inner portion of the folded filter medium, the degree of compression gradually decreasing towards the outer surface, thereby insuring the entrapment of the finest particles within the medium.

Even under these circumstances, however, if encrustation is encountered there is sufficient residual resilience and compressibility in the deep matting assembly to permit flexing of the fibres, as by a roller bearing against the surface of the matting exposed by the drum. This breaks the brittle crust formed by the salts on the fibres and permits the dislodged material to be washed free of the medium by forcing fluid through the filter in a reverse direction.

Figure 2:
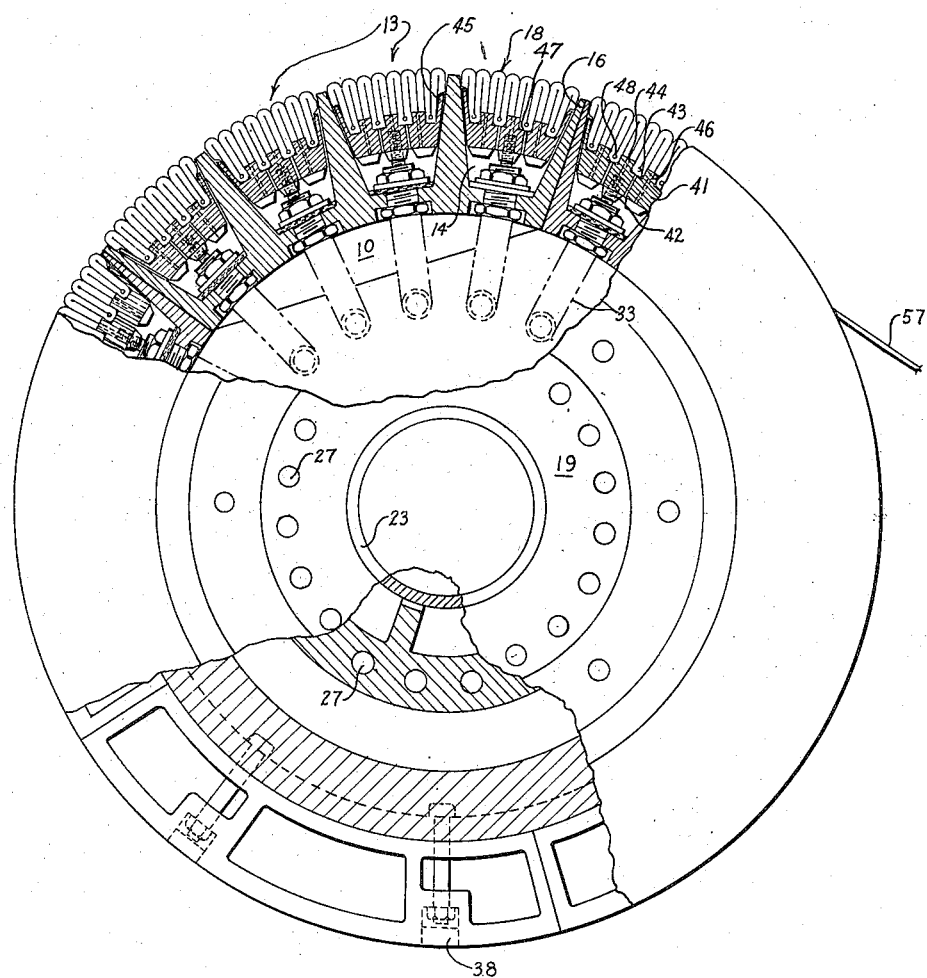
Fig. 2 is an end elevation of the drum shown in Fig. 1, with portions broken away to show sections taken along the lines AA and BB of Fig. 1.
Figure 3:
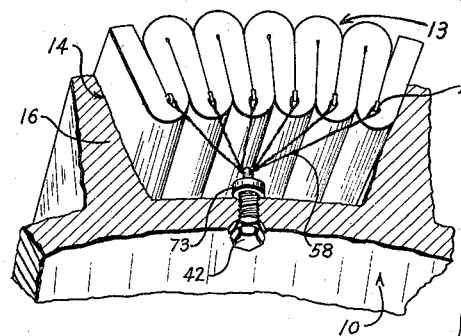
Fig. 3 is a partially sectioned perspective of a modified form.

For a more detailed description, reference is made to Figs. 1 and 2, wherein we have illustrated a rotatable drum filter having a periphery built up of five metal sectors 10 removably secured as by bolts 11 to circular shoes 12. Each sector may include four or more sections, generally designated 13, having inwardly tapered openings 14 defined by sidewalls 16 and end walls 17 in which filter media generally designated 18 is secured. The precise number of sectors per drum or sections per sector may be varied as desired. The shoes 12 are secured to hubs 19 and 21 by bolts 22, the hubs being mounted for rotation on a hollow axial shaft 23. Rings 24, secured to the inner faces of the hubs 19 and 21 by bolts 26, are provided to center the hubs on the shaft.

Figures 5, 8:
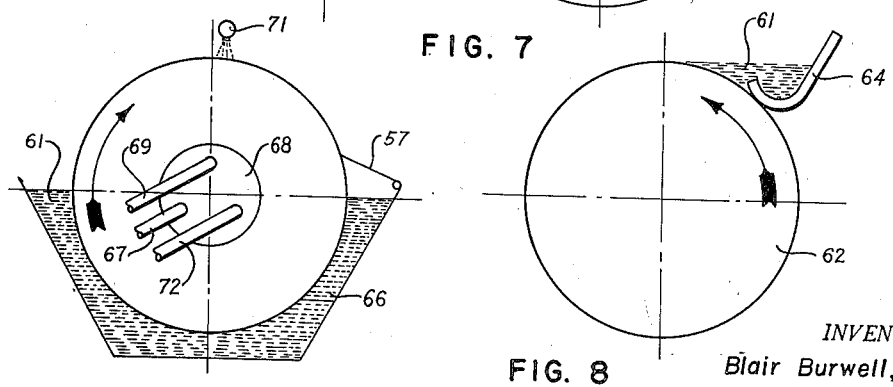
Fig. 5 is a diagrammatic end elevation of a drum type filter, such as including the drum of Fig. 1.

The hub 19 is connected to suitable driving means, such as a motor and speed reducer (not shown) to rotate the drum at the desired speed. The other hub 21 is provided with a smooth face and rotates against a smooth stationary valve plate 68 (Fig. 5) having conduits each suitably connected to a source of vacuum, compressed air, wash liquid, and such other connections as may be necessary for the operation of the particular filter. The hub 21 is provided with a series of openings 27 extending through the hub and provided at their inner ends with nipples 28, to which suitable conduits 29 may be secured by rubber hoses 31 held in place by wires 32 or other suitable external clamping means. The opposite ends of the conduits 29 are similarly attached to elbows 33 each of which connects with one of the sections 13 to conduct filtrate from the inner side of the filter medium 18 through the filter. The elbow 33 may be secured by nuts 34 and washers 36 in a suitable opening provided for this purpose in each section. Various joints or openings in the structure through which liquid might penetrate without passing through the filter medium, as for example, openings 37 provided for the bolts 11, may be caulked or sealed with wooden plugs 38 or other suitable means. The hoses 31 impart sufficient flexibility to the structure to permit each sector to be lifted from the shoes 12 by loosening the bolts 11, after which the hose may be removed from either the conduit or the elbow to permit complete removal of the sector. If desired, a plate 39 may be mounted on the hollow shaft 23 to support the elbows 33 or the conduits 29. Thus, as the filter is rotated, the openings 27 will in rotation become aligned with the various openings on the stationary valve plate, transmitting fluid pressure or vacuum to each section in the proper sequence and intensity.

As best seen in Fig. 2, the peripheral openings 14 in each section have inwardly sloping side walls 16 defining wedge shaped openings in each of which a base 41 of wood, rubber, plastic, or the like, is secured as by bolts 42. The bases may be recessed and are provided with longitudinal dovetail grooves 43 defining intermediate lands 44. A plurality of openings or passageways 46 extend through the base 41 to permit the passage of liquid to the conduits 33. Filter medium 18, such as cocoa matting, is folded into face to face contact, the lower portions 47 of alternate folds being forced into the dovetailed grooves 43 and secured therein by dowels 48 inserted from the outer face of the folds to wedge the compressible matting into the groove. Alternate inner edges of the folds therefore contact the lands 44 and the ends held within walls 45, defining the recess of the base 41. If desired, the base 41 may be provided with transverse grooves interconnecting the longitudinal grooves to increase the area of passageways available for the transfer of filtrate downwardly into the conduits 33.

The filter media 18, as previously mentioned, is obtained in the form of a relatively thick sheet or mat of material cut to a width equal to the length of the openings 14 and composed of resilient fibres which may be either organic or inorganic in composition. We prefer to staple, sew or otherwise secure the mat in folds to insure that the folded assembly is maintained with the faces in contact with each other throughout substantially the entire depth of the medium. This may be accomplished either before or after medium is secured to the base 41. When properly folded and attached to the base, the faces of the folds or sections will be generally parallel to and in a radial plane through the drum axis, it being understood that the medium in each section may be formed from a single length of mat, or built on from several sections of matting. The outer surface of the assembled filter medium should be flush with the drum surface or may project slightly. Although not desirable, the outer surface may be disposed inwardly from the drum surface, but a reduction in efficiency may be noted in such instances, since the solids on the outer surface may not always be completely removed.

If by trial after assembly the density is found to be insufficient, the bolts 42 holding the base 41 in the opening 14 may be tightened, thus drawing the base and the filter medium further into the tapering opening and compressing the filter medium to a greater degree. It will be noted that the pressure exerted against the medium by the sidewalls 16 will be greater towards the inner face of the filter medium than against the outer, and the effective density of the filter medium will therefore gradually decrease outwardly to the surface. Buckling will not occur however, since the end walls 17 are parallel and in contact with the end of the medium 18.

Figure 4:
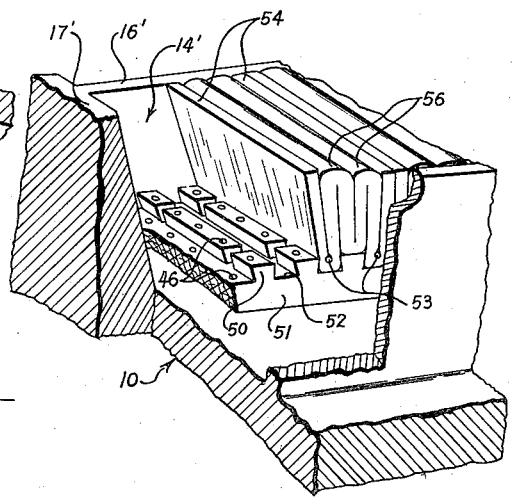
Fig. 4 is a partially sectioned perspective of a further form.

A modified form of filter medium is illustrated in Fig. 4, wherein a base 51 is provided with a series of transverse, rather than longitudinal dovetail grooves 52 defining transverse lands 50. A strip of cocoa matting or the like having a width equal to or slightly greater than the width of the opening 14' is folded transversely and secured as by staples in face to face contact. Dowels 53 are employed, as previously described, to retain the alternate folds of the matting with grooves 52. We have shown in Fig. 4 a medium made up of several short lengths of matting, the outer surface thereof having exposed cut edges 54 and folded portions 56. To avoid buckling, the side walls 16' of the opening are parallel, but the end walls 17' slope inwardly and are generally parallel to the faces of the folds.

Various other methods of folding may be employed, but the use of folded strips of matting is a convenience rather than a necessity, since parallel short sections secured together having an outer and inner surface composed entirely of cut edges will also be effective.

In operation, the drum is immersed in a suitable tank 66 (Fig. 5) containing fluent matter 61 to be filtered. As the sections 13 successively enter the liquid, vacuum is established in the conduits 29 through the openings 27 and a conduit 67 in a valve plate 68 to draw liquid inwardly through the filter medium, thereby removing the solid particles from the liquid. As each section emerges from the liquid, the degree of vacuum may be increased through conduit 69 to insure the withdrawal of all filtrate from the filter medium and from the conduit, after which wash water may be applied to the exterior of the drum from a spray nozzle 71 and drawn through the filter medium. The cake formed on the outer surface of the drum, as well as the material deposited within the filter medium, may then be loosened by the application of liquid or air under pressure through a conduit 72, causing fluid flow in a reverse direction through the medium, this action being aided by a suitable scraper 57 disposed to contact the surface of the drum. It should not be understood from the foregoing that this is the only method of operation which may be utilized with our filter, since obviously by reversing the direction of taper of the peripheral openings, the liquid may be forced outwardly from within the drum in a manner well known to those skilled in the art.

Although a base is often desirable, it is not essential, since the medium may be secured within the opening 14 by attaching wire bridles 58 to the ends of the dowels 48 and to the bolts 42, the latter being provided with a swiveled head 73 in this instance. The bolt 42 may then be drawn downwardly, pulling the matting firmly into the opening 14 and retaining it in position. A similar expedient may be employed with the form shown in Fig. 4.

Figure 6:
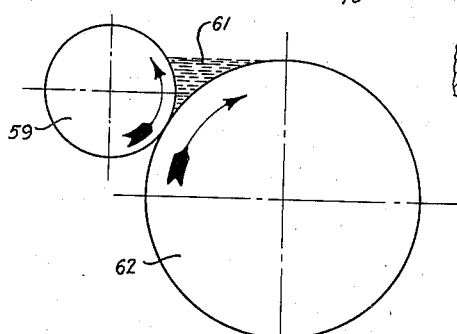
Figs. 6 to 8, inclusive, are diagrammatic end elevations of a drum and roller, double drum and drum and apron type filters, respectively, to which the principles of this invention are particularly applicable.
Figure 7:
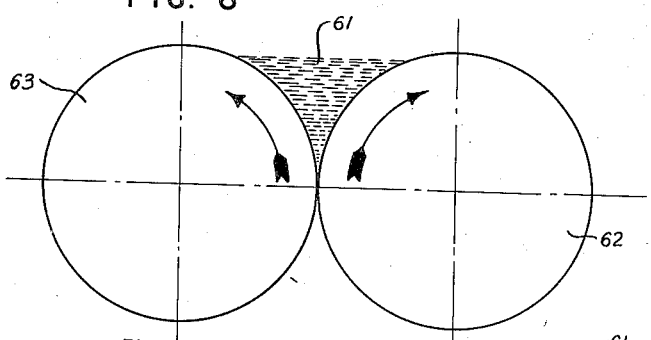

The greater resistance to wear of the filter medium of this invention is of particular value in connection with a filter of the type described and claimed in the co-pending application of C. Lynn Peterson, Serial No. 504,831, filed October 4, 1943, now Patent No. 2,499,412, March 7, 1950, and illustrated diagrammatically in Figs. 6–8, inclusive. As shown therein, a body 61 of fluent matter is maintained above the horizontal center line of a rotating drum 62, so that the filtrate will be pulled downwardly through the filter medium attached to the periphery of the drum, and gravity and wave effects will assist in the deposition of solid particles. The body of fluent matter may be prevented from flowing off the drum by means contacting the drum along a substantially horizontal line, such as a roller 59, as in Fig. 6, or a second drum 63, as in Fig. 7, or an apron 64, as in Fig. 8. The roller 59 of Fig. 6 and apron 64 of Fig. 8 merely form a seal for the body of fluent matter, preferably being formed of rubber or other suitable resilient material; whereas drum 63 of Fig. 7 is provided with a filter medium surface, in the same manner as drum 61. The drum and roller of Fig. 6, and the pair of drums of Fig. 7, are rotated in opposite directions, as shown. Due to the contact of the surfaces, wear on the filter medium of drums 62 and drum 63 tends to be considerably greater than in the normal instance, such as in the case of the type of filter illustrated in Fig. 5. When the filter medium of this invention is utilized about the periphery of drum 62 or 63, much longer wear is obtained. The pressure exerted against drum 62 by the roller 59 or drum 63 may be sufficient to flex the fibres of the filter medium on drum 62, if necessary to break incrustation formed on the fibres.

As explained previously, in the filter section of this invention, which is particularly adapted to carry out the method of this invention, the fibrous material has sufficient depth and is relatively loosely packed but is sufficiently close together to permit liquid to be pulled therethrough by a suction or vacuum effect, and at the same time prevent the passage of solid particles entirely therethrough. Thus, instead of a filter medium which will retain particles, causing them to bridge across fibers a layer of particles upon which subsequent particles build, as in what may be termed "surface" filtration, the filter medium is relatively deep and loose, to retain the particles in depth, with subsequent filtration taking place on these particles. In other words, the solid particles penetrate and are deposited within the filter medium to form a secondary filter, as it were, within the filter medium or primary filter.

The advantages of the filter section of this invention are numerous. For instance, the resistance to flow of liquid is usually no greater than with a considerably thinner, but tightly woven, filter medium. The depth of the filter medium is such that the vacuum effect is equalized therethrough, and should the vacuum effect be greater at one point than at another, the greater number of solid particles pulled into the filter at such point soon builds up a secondary filter which compensates for the difference, thus again equalizing the vacuum effect over the filter. In addition, the secondary filter built up within the primary filter is highly effective in screening out relatively small particles, and particularly effective in removing particles which vary considerably in size. Also, the relative density or spacing of the fibers can be varied relatively widely, since the secondary filter may be built up close to the outer surface, or close to the inner surface of the filter medium, without affecting seriously the filtering qualities or results obtained.

Further advantages are that a greater amount of solid material can be deposited in a given amount of time, due to penetration of the filter medium by the solid material. Also, such penetration of the filter medium reduces the amount of filtrate contained in the cake, due to blowback, which is a phenomenon caused by filtrate remaining in the filter medium and being blown back into the cake when a pressure effect is produced to loosen the cake just prior to its being scraped off. Since the fibers of the filter medium of this invention are normally less closely spaced together than a relatively tightly woven thin fabric, the filtrate passes more readily therethrough, and is more effectively displaced by wash water. Thus, when a pressure effect is produced for loosening the cake, any blowback that occurs results in wash water, rather than filtrate, in the cake.

The cake may be more effectively removed, since the filter medium of this invention will stand a considerably greater amount of scraping than the relatively thin fabrics formerly used. Should the outer portion of the filter medium become worn due to scraping, the damage is not serious because there is still plenty of filter medium beneath the outer surface to effectively remove solid particles. Furthermore, the wear is across the ends of the fibers rather than parallel to their general direction, which reduces scuffing and increases abrasion resistance. An additional advantage of the method and filter section of this invention lies in the reduction of difficulties caused by incrustation.

In our filter, the whole mass of fibers may be flexed, as by the roller 59, in different directions; i. e., the filter section of this invention has depth as well as length and breadth, whereas the relatively thin filter cloths previously in use have very little dimension in depth, but only dimensions in length and breadth. Therefore, the filter section of this invention can be flexed in three dimensions, as it were, whereas the previous filter cloths can be flexed only in two dimensions.

Another advantage of the filter section of this invention is its value in connection with the method and filter disclosed and claimed in the patent of Clarence J. and C. Lynn Peterson, No. 2,403,021 of July 2, 1946. The method and filter of this application are particularly valuable in overcoming the problem of slime deposition, slimes being relatively small particles of clayey or other matter which impregnate and mechanically blind the usual filter mediums. As disclosed in such copending application, a pre-coat of pulverized coal, charcoal, other carbonaceous material, diatomaceous earth, or other suitable material, is applied to the filter medium prior to the deposition of solid particles from the body of fluent matter. The slimes do not penetrate such a pre-coat to an appreciable extent, and with the normal relatively thin filter medium, the pre-coat is removed along with the deposited particles during each revolution of the drum.

Carbonaceous material is particularly suitable for use as a pre-coat in such operations, since it may be removed from the ore during subsequent roasting, or similar treatment. Such pre-coat operations are carried out very effectively with apparatus of the type illustrated in Figs. 6 to 8, inclusive, the pre-coat being applied to the lower portion of drums 61 and 63, prior to the passage of the filter medium through the body 60 of fluent matter. The slimes tend to separate and pass to the top of the body of fluent matter, so that the larger particles are freely deposited on the filter medium and the slimes, which otherwise would tend to clog the filter medium, are deposited upon the layer of larger particles when the filter medium reaches the top of the body of fluent matter. The slimes are removed along with the larger particles and are thus recovered but without adversely affecting operation of the filter.

In addition, when a relatively deep, loose filter medium of this invention is utilized in such pre-coat operations, further advantages result. Instead of the pre-coat being deposited upon the surface and removed entirely during removal of particles deposited from the body of fluent matter, a portion of the pre-coat is blown out or otherwise removed, with the rest of the pre-coat material remaining in the filter medium. Of course, as the filter medium passes again through the body of pre-coat material, an entire layer is completed by pick-up, so that when the filter medium passes through the body of fluent matter again, the slimes will not penetrate the pre-coat to any appreciable extent. Also, the portion of the pre-coat removed with the larger deposited particles carries with it any slimes that may have penetrated into the pre-coat. Due to the portion of the pre-coat remaining in the filter medium, less pre-coat material is contained in the removed deposited particles, and also less pre-coat material is necessary for continuous operation. The actual density of our matting need not be closely controlled since we may control the effective density of the machine by its position in the tapered peripheral openings. Only one type of raw material therefore is required, regardless of the fineness of material being filtered.

From the foregoing, it will be apparent that the method of this invention provides more effective and economical filtration than previous operations. It will also be evident that the apparatus of this invention is particularly adapted to carry out the method thereof, and provides more economical operation because of reduced maintenance costs. Also, a filter section constructed in accordance with this invention is more efficient and effective in operation and may be applied to a number of different types of filters, including drum filters and disc filters.

It will be understood that various changes may be made in carrying out the method of this invention, and also in the filter section and the apparatus of this invention. For instance, the shape and position of the filter sections may be varied; other materials for the filter medium than those enumerated may be utilized; and the principles of this invention may be utilized in other types of filters, such as the leaf or disc type.

It will also be understood that embodiments of this invention other than those described may exist, and that further changes may be made, all without departing from the spirit and scope of this invention.

We claim:

1. A filter medium section comprising a base adapted to be attached to a filter drum or the like, said base having on the outer side a longitudinally extending recess provided with longitudinally extending grooves in the bottom thereof providing lands between said grooves; a filter medium held within said recess, said filter medium comprising a plurality of layers extending transversely to the outer surface of said section, into each of said grooves, and abutting against said lands; and means for retaining said filter medium in said recess substantially constant in shape and volume so as to provide a substantially undeviating outer surface.

2. A filter medium section as defined in claim 1, wherein said filter medium comprises cocoa matting.

3. A filter medium as defined in claim 1, wherein said filter medium comprises a fabric having a relatively deep, heavy pile on the order of cocoa matting, and said section includes longitudinally extending rods for holding said fabric in said grooves.

4. A filter medium section comprising a base adapted to be attached to a filter drum or the like, said base having on the outer side a longitudinally extending recess provided with longitudinally extending grooves in the bottom thereof providing lands between said grooves; a filter medium within said recess, said filter medium comprising a fabric having a relatively deep, heavy pile on the order of cocoa matting, and also comprising a strip folded upon itself with alternate inner folds extending into said grooves and the remaining inner folds abutting against said lands, the outer folds being at substantially the same elevation to provide a relatively undeviating outer surface; and means for retaining said filter medium in said recess.

5. A filter medium section comprising a base adapted to be attached to a filter drum or the like, said base having on the outer side a longitudinally extending recess provided with longitudinally extending grooves in the bottom thereof providing lands between said grooves; a filter medium within said recess said filter medium comprising a fabric having a relatively deep pile on the order of cocoa matting and divided into a plurality of strips, each strip extending longitudinally of said section and being folded upon itself, a center fold of each strip extending into a groove and the adjacent ends of said strip abutting against the lands on either side of said groove, each strip also forming two folds at the upper surface of said filter medium, such upper folds of all said strips being at substantially the same elevation to provide a relatively undeviating upper surface; and means for retaining said filter medium in said recess.

6. A filtration unit comprising a pair of rigid members having opposed surfaces sloping inwardly from their outer edges, parallel walls connecting the members and defining therewith an opening for the passage of filtrate, a perforate filter medium support in the opening, a filter medium secured to said support, said filter medium including compressible fibrous mat sections disposed in face to face contact, and means for drawing said support into the opening a distance sufficient to confine most of the filter medium within said opening and with the outer faces of said filter medium in contact with the sloping surfaces of said rigid members.

7. A drum filter having its peripheral surface divided into a plurality of inwardly tapering openings defined by walls on the filter having opposed converging surfaces and cross walls connecting said first-mentioned walls, a perforate filter medium support for one of the openings, a filter medium secured to the support comprising sections of compressible fibrous matting in face to face contact, the outer faces of said medium engaging said converging surfaces, and means for adjustably drawing the filter medium and support into the opening whereby the density of said medium is increased by the wedging pressure of the converging surfaces.

8. A drum filter having its peripheral surface divided into a plurality of inwardly tapering openings defined by walls on the filter having opposed converging surfaces and cross walls connecting said first-mentioned walls, a perforate filter medium support for one of the openings, a filter medium secured to the support comprising sections of compressible fibrous matting in face to face contact, the outer faces of said medium engaging said converging surfaces, and a screw for forcing the support into the opening whereby the density of said medium is increased by the wedging pressure of the converging surfaces.

C. LYNN PETERSON.
CLARENCE J. PETERSON.
BLAIR BURWELL.

REFERENCES CITED

The following references are of record in the file of this patent:

UNITED STATES PATENTS

| Number | Name | Date |
|---|---|---|
| Re. 14,214 | Akins | Nov. 14, 1916 |
| 232,122 | Hammesfahr | Sept. 14, 1880 |
| 1,367,325 | Probst | Feb. 1, 1921 |
| 1,833,315 | Burhans | Nov. 24, 1931 |
| 1,836,308 | Bull | Dec. 15, 1931 |
| 1,878,998 | Akins | Sept. 27, 1932 |
| 1,962,542 | Wieneke | June 12, 1934 |
| 2,065,263 | Beldam | Dec. 22, 1936 |
| 2,073,442 | Briggs | Mar. 9, 1937 |
| 2,134,703 | Cobb | Nov. 1, 1938 |
| 2,313,343 | Jacob | Mar. 9, 1943 |
| 2,395,449 | Briggs | Feb. 26, 1946 |

FOREIGN PATENTS

| Number | Country | Date |
|---|---|---|
| 16,237 | Great Britain | of 1907 |
| 292,719 | Great Britain | of 1928 |